Nov. 18, 1941.   J. HOZA   2,263,132
LASTING MACHINE
Filed April 20, 1940   9 Sheets-Sheet 1

FIG.1.

Nov. 18, 1941.　　　　J. HOZA　　　　2,263,132
LASTING MACHINE
Filed April 20, 1940　　　9 Sheets-Sheet 2

Nov. 18, 1941.   J. HOZA   2,263,132
LASTING MACHINE
Filed April 20, 1940   9 Sheets-Sheet 3

Inventor
John Hoza
By John E Eastlack
attorney

FIG. 6.

Nov. 18, 1941.  J. HOZA  2,263,132
LASTING MACHINE
Filed April 20, 1940   9 Sheets-Sheet 5

FIG.7

Nov. 18, 1941.   J. HOZA   2,263,132
LASTING MACHINE
Filed April 20, 1940   9 Sheets-Sheet 6

Inventor
John Hoza
By John E. E. ......
Attorney

Nov. 18, 1941.    J. HOZA    2,263,132
LASTING MACHINE
Filed April 20, 1940    9 Sheets-Sheet 7

FIG. 9.

Inventor
John Hoza
By John E Easton
Attorney

FIG.10.

Nov. 18, 1941.    J. HOZA    2,263,132
LASTING MACHINE
Filed April 20, 1940    9 Sheets-Sheet 9

Inventor
John Hoza
By John E. Eastlack
Attorney

Patented Nov. 18, 1941

2,263,132

UNITED STATES PATENT OFFICE 2,263,132

LASTING MACHINE

John Hoza, Belcamp, Md.

Application April 20, 1940, Serial No. 330,778
In Czechoslovakia November 14, 1938

11 Claims. (Cl. 12—10)

This invention relates to a lasting machine for pulling-out and wiping-over the toe-portion of a shoe-upper positioned on a last, as a preliminary to tacking said upper to the insole, or sole.

An object of the present invention is to provide a machine by which the upper may be pulled-out more satisfactorily than hitherto, so that the upper conforms faithfully to the shape of the last.

An ancillary object of the invention is to avoid damage to the upper when it is wiped-over by the wiper.

A third object of the invention is to allow the upper, when it has been pulled out to be positionally-adjusted across the last and also towards the heel or the toe thereof, i. e. to allow positional adjustment in all directions.

A fourth object of the invention is to allow the machine to be readily reversely actuated so as to allow repetition of operations which may not have been entirely satisfactorily carried out.

Another object of the invention is to provide a machine which while being effective and rapid in operation, nevertheless allows adequate time for positional adjustment of the upper on the last, the time for such adjustment being indeed in the control of the operator.

Broadly the invention may be defined as a lasting machine comprising pincer-pairs adapted to grip the upper at positions around the edge of its toe-portion, supports for said pincer-pairs allowing movement of said pairs between a grip-taking position and a displaced position being movement in paths which are in accordance with the shape of the last, a wiper movable to wipe-over the upper on the last, the pincer pairs in displaced position being free of the path of said wiper, and actuating mechanism which, the pincer pairs being in grip-taking position, causes the said pairs to grip the upper, thereafter causes movement of the said pairs to displaced position so as to stretch the upper firmly over the last and causes the wiper to wipe-over the upper, the pincer pairs being caused to release their grip to the wiper in such a way as to maintain the upper in stretched condition and being maintained in displaced position so as not to obstruct said movement of the wiper.

One example of the invention will now be described with reference to the accompanying drawings, whereon.

Figure 1:
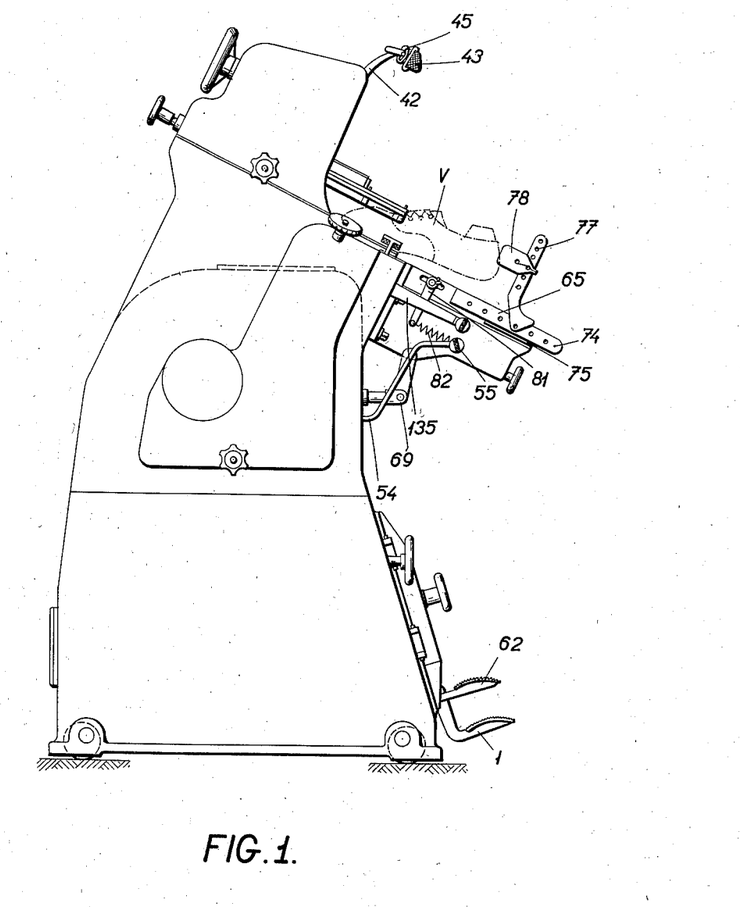
Fig. 1 is a general side elevation of the machine.
Figures 2, 4:
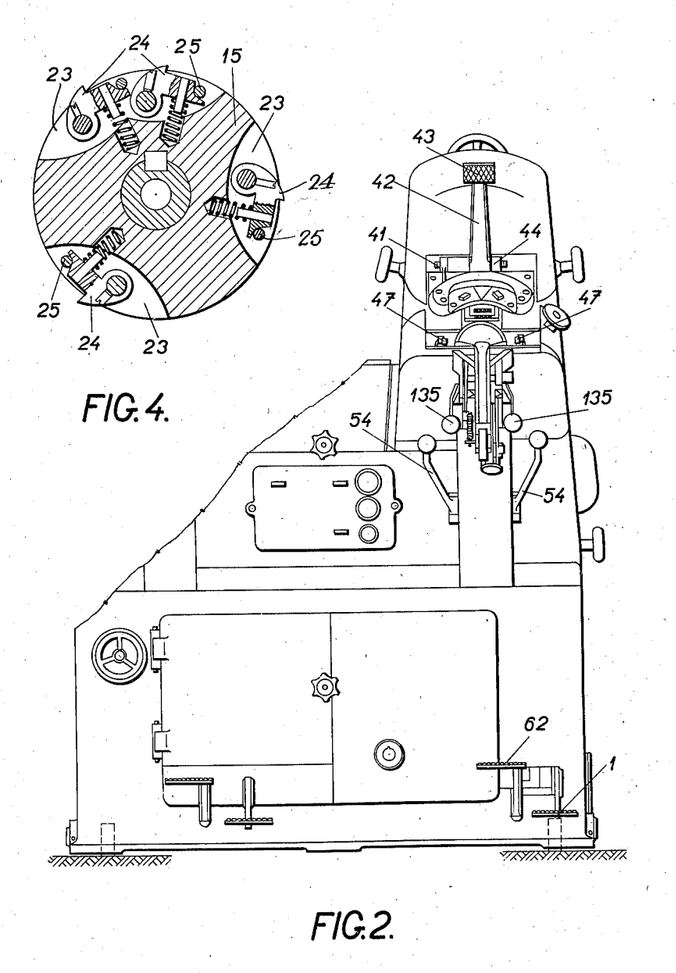
Fig. 2 is a front elevation of the machine, i. e. looking from right to left in Fig. 1.
Fig. 4 is an enlarged sectional view of the control disc, a component of the main actuating mechanism.
Figures 3, 5:
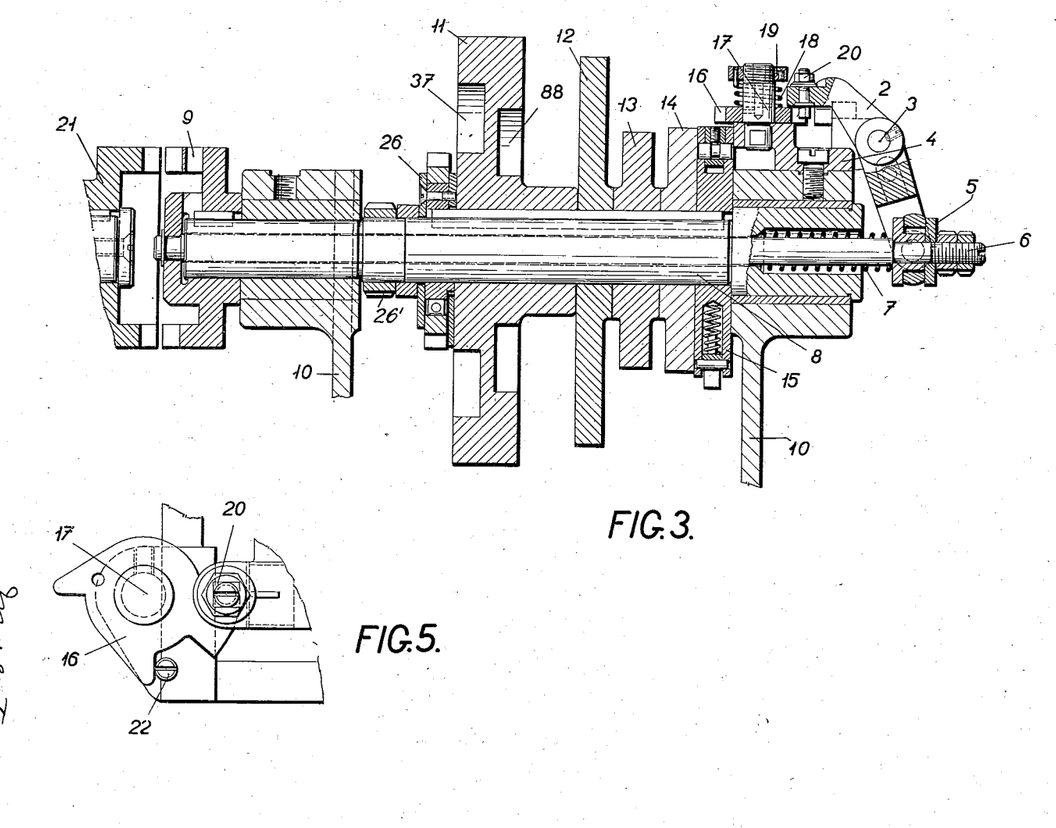
Fig. 3 is an enlarged sectional view of the main actuating mechanism.
Fig. 5 illustrates a detail of the escapement, also a component of the main actuating mechanism.

Referring to the drawings: The right-hand pedal 1 illustrated in Figs. 1 and 2 is connected by rod mechanism (not shown) to a lever 2 (Fig. 3) which is pivotal about a pivot 3 in a bearing 4 for the escapement. This lever 2 is attached to a bush 5 loosely mounted on a shaft 6 and acted upon by a spring 7. The shaft 6 is slidable in the hollow main-actuating shaft 8. One element of a clutch 9 secured against axial movement on the shaft 6 is slidably keyed to the shaft 8, so as to rotate therewith. The main shaft 8 is journalled in the bearings in the machine frame 10 and carries a disc 11 with eccentric tracks 37 and 88; cams 12, 13, 14; and a control disc 15 for controlling the various operations, i. e.

of the pincers and the smoothing device. Alongside the eccentric 11 a gear 26 is secured to the shaft 8 by means of a uni-directional clutch whose one element is keyed on the shaft 8. The gear 26 allows a return motion to be imparted to the machine, as will be explained later.

The bearing 4 is attached to the bearing on the frame 10 for the main shaft 8, being positioned between the disc 15 and the lever 2 by means of a screw, and this bearing carries an auxiliary control device, constituted by the escapement co-operating with the lever 2 and the disc 15. The said escapement, which is denoted by reference 16 (Figs. 3 and 5) is rotatably mounted on a pivot 17 and sprung by means of a coil spring 18 secured at the top by a nut 19. The escapement 16 is normally secured against rotation (i. e. when the pedal 1 is not depressed) by means of a screw 20 at the end of the lever 2, the screw registering with a recess in the escapement. On depressing the pedal the lever 2 swings upwards, carrying with it the screw 20 and through the bush 5 acting against the spring 7, moves the shaft 6 axially and causes the element 9 of the clutch to engage with the other and drive-receiving element 21, thus putting the machine in operation. The escapement, which has been freed, is rotated by the spring 18 until it comes into contact with the pin 22, when it is again stopped. The control disc 15 (Figs. 3 and 4) has recesses 23 in which are pivoted spring-controlled pawls or fingers 24 which in normal rotation are secured by pins 25. While thus secured, the fingers are adapted to engage teeth on the escapement.

Figure 6:
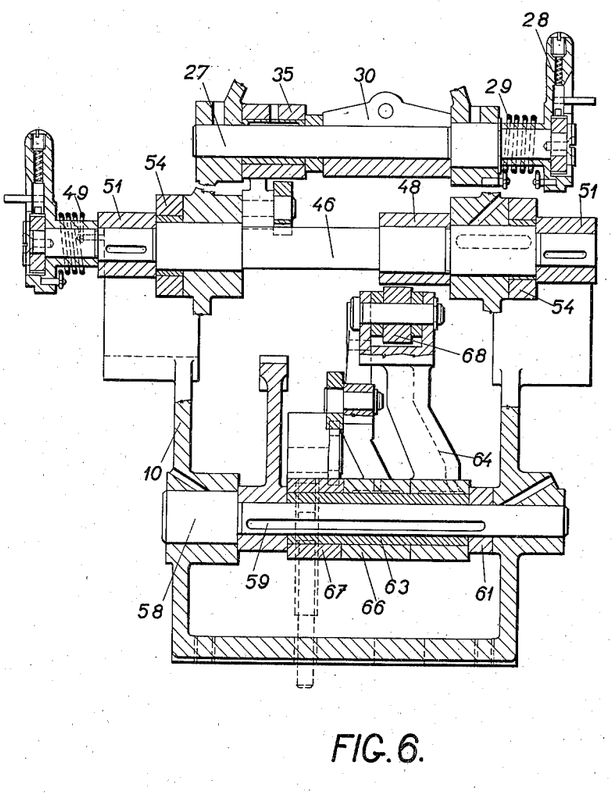
Fig. 6 is an enlarged front sectional elevation of the lever mechanism, which is under the control of the main actuating mechanism.
Figure 7:
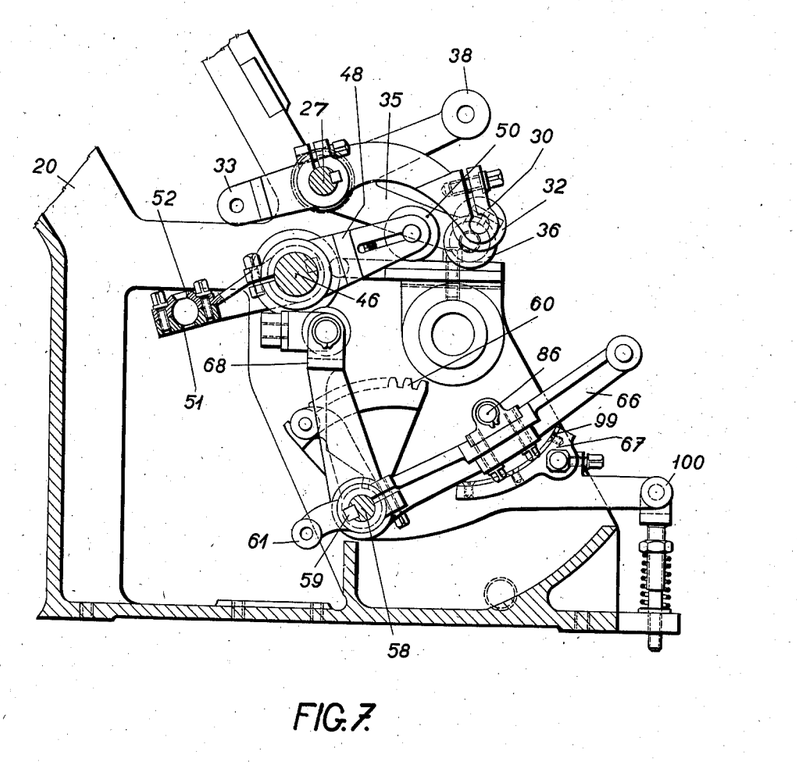
Fig. 7 is a part sectional side elevation of the lever mechanism, looking from right to left in Fig. 6.
Figure 9:
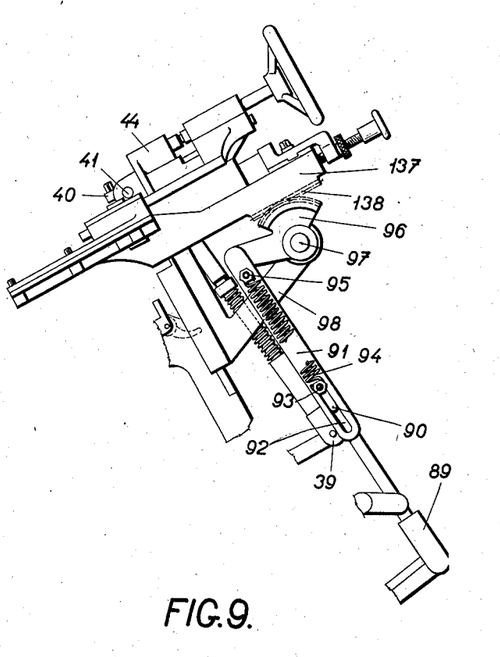
Fig. 9 is an enlarged detail view showing the smoothing device in side elevation, (Figs. 6, 8 and 9 are views taken from the side which is obscured in Fig. 1).

A shaft 27 (Figs. 6 and 7) is also journalled in the frame 10. It is a component of the lever mechanism under the control of the main actuating mechanism. It carries at one end a tensioning arm 28 which by means of a spring 29 presses a further lever 30 to bear with its roller 32 against the cam 13, which is for the front pair of pincers. The other end of this lever 30 has a bearing 33 in which a connecting rod 34 for operating the front pincers 31, is attached by means of a pin 101. Alongside this lever 30 is a bell-crank lever 35, one end of which engages by means of a roller 36 in the groove 37 of the eccentric 11 and whose other end 38 has attached to it a spring-loaded grooved rod 39 which is articulated at its upper end to a crank 40 (part of which is visible in Fig. 9) mounted on a shaft 41 carrying a lever 42, which supports a pad 43 (Fig. 1) the shaft 41 being journalled in the support 44 of the wiper (Figs. 2 and 9). The pad 43 is located in a slideway 45, which permits the pad to be adjusted to various positions.

Figure 10:
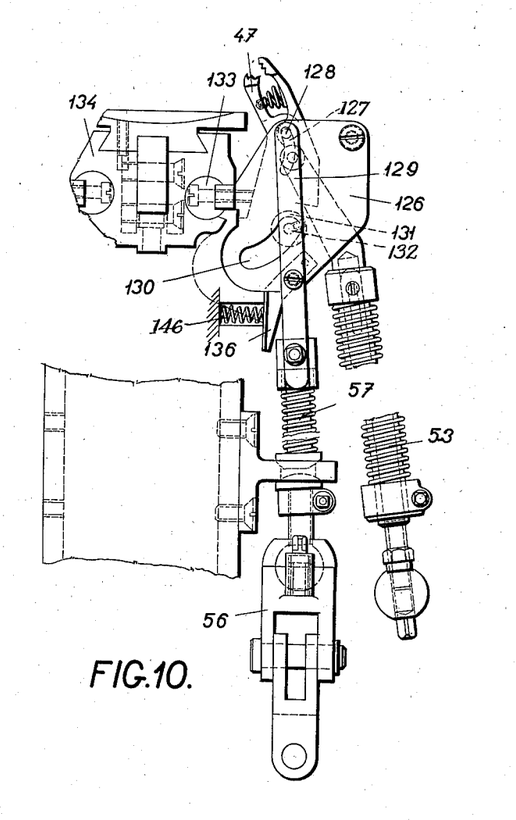
Fig. 10 is an enlarged front elevation of a side pair of pincers.

Beneath the shaft 27 a shaft 46 (Figs. 6 and 7) for the left and right hand side pairs of pincers 47 (Figs. 2 and 10) is journalled in the stand 10. As in the case of the front pincers, there is mounted on the forward end of the shaft 46 a crank 48 which is pressed by means of a spring 49 fixed on the shaft 46 to bear with its roller 50 against the cam 14, which is for the side pincers 47. On both sides of the machine cranks 51 (Figs. 6 and 7) are keyed to the shaft 46, these cranks carrying at their ends ball bearings 52 for connecting rods 53 which operate the side pincers (one such rod being shown in Fig. 10). Alongside these cranks 51 cranks 54 each with a handle 55 (Figs. 1, 2 and 6) are loosely mounted on the shaft 46, and attached to the latter cranks are ball bearings 56 (Fig. 10) for push rods 57 for the side pincers.

Figure 11:
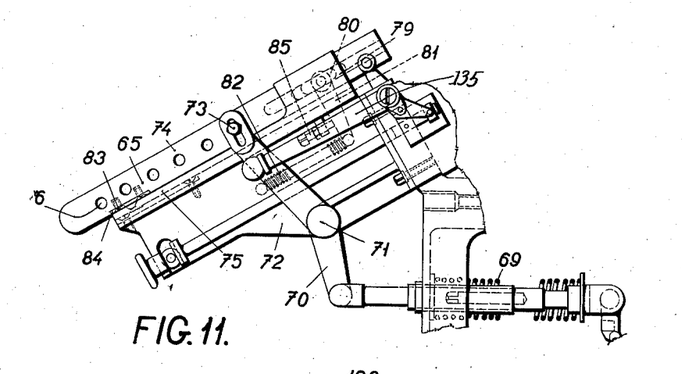
Fig. 11 is a side view of the device for actuating the heel support, again looking from the side which is obscured in Fig. 1.
Figure 12:
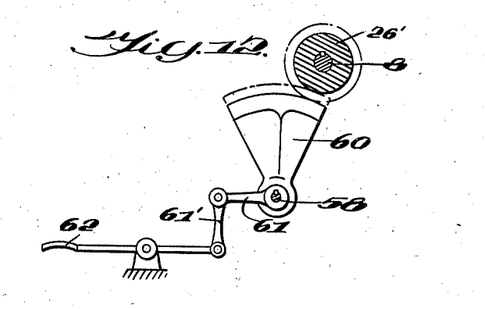
Fig. 12 is a sectional elevation showing the reversing mechanism.
Figure 13:
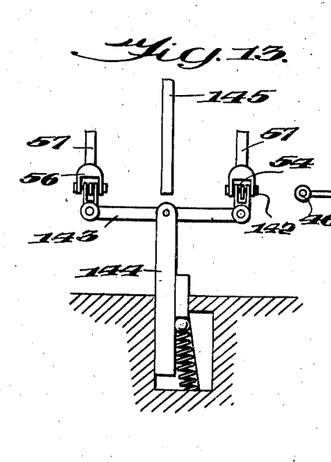
Fig. 13 is a fragmentary front elevation showing the locking mechanism for the side pincers.
Figure 14:
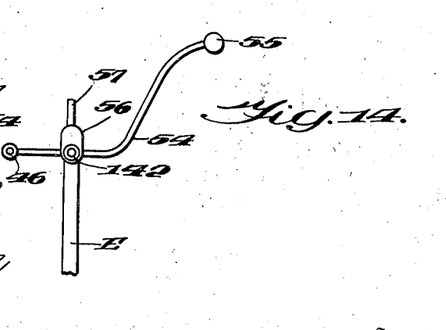
Fig. 14 is a view similar to Fig. 13 but showing the parts in side elevation.
Figure 15:
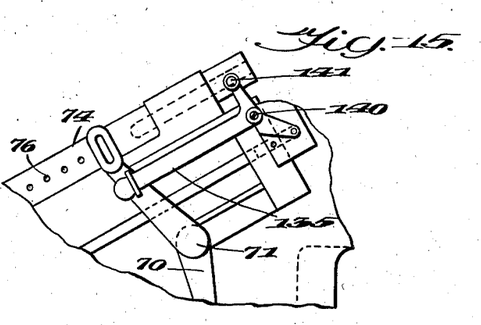
Fig. 15 is a fragmentary view similar to Fig. 11 with parts removed showing one of the hand operated adjusting levers.
Figure 16:
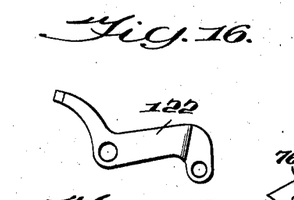
Fig. 16 is an enlarged detail showing the last support in side elevation.
Figure 17:
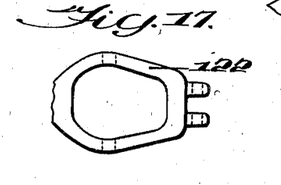
Fig. 17 is an enlarged plan view of the last support.

In the lower part of the machine frame 10 a shaft 58 having a longitudinal key 59 (Figs. 6 and 7) is journalled, this shaft carrying a crank 61 attached by means of a connecting rod 61' to the other pedal 62. The shaft carries also a toothed segment 60 meshing with a gear 26' on the main shaft 8, and in this way, if it is desired to reposition the upper prior to the upper-stretching operation, by depressing the pedal 62, return motion may be imparted to the shaft 8. A bush or collar 63 provided with a groove for the key 59 is mounted on the shaft 58 between the segment 60 and the lever 61. Loosely mounted on this shaft are a lever 64 for actuating the heel-support 65 (Figs. 1 and 11), a lever 66 for actuating the wiper, and a lever 67 for braking and regulating the operation of the machine.

The lever 64 for actuating the heel-support 65 has at its end a bearing in which there is carried, by means of a pivot, a roller 68 (Figs. 6 and 7) which constantly presses against the cam 12, which is for actuating the heel support, and also a fork to which is screwed a double spring-influenced push rod 69, which presses the lever 64 against the cam 12 and at the same time permits the resilient insertion of the shoe into the smoothing device. At the other end of the rod 69 a two-armed lever 70 is pivoted, about a pivot 71 on the heel carrier 72 attached to the frame 10, the other end of this lever having an eye engaged by pin 73 on a rail 74 which moves to and fro in a slideway 75 in the said carrier 72. The rail 74 is provided with holes 76 which allow the handle 77 (Fig. 1) of the padded angle piece 78 to be adjusted according to the kind of shoe being dealt with. The angle piece 78 is in turn adjustable on the handle 77. At the front, i. e. towards the toe of the shoe the rail 74 has a lateral groove 79 in which runs a T-shaped slide 70 carrying at its projecting end an arm 81 connected at its lower end to a spring 82 secured in turn to the carrier. The spring 82 serves to raise the other and lower end of the rail 74 from the carrier 72, which is provided with a longitudinal groove 83 in which is disposed a pawl 84 for securing the rail 74 when contact is made with the shoe for the wiping-over operation. For this purpose the rail is provided with the pawl 84 adapted to snap into the groove. The movement of the lever 81 is limited by a pin 85 on the carrier 72. The spring 82 serves to return the rail 74 to its initial position.

The lever 66 of the wiper has a pin 86 carrying a roller 87 which runs in the groove 88 of the eccentric 11. The end of lever 66 carries a connecting rod 89 (Fig. 9) with a head 90 slidable in slots 92 in side guides 91. Attached to screws 93 screwed into the head 90 are springs 94 (only one screw and spring being visible) and the springs are secured in turn in the guides 91 by screws 95. At the other end the guides are pivotally connected to levers 96 pivotal about a pin 97 on the wiper's carrier 98. The levers embody each a toothed segment which imparts a to-and-fro movement to the actual wiper. The springs 94 render the wiper yieldable while wiping over the shoe upper. The carrier 98 is adjustably attached to the machine frame at the pincers' slideway, and it has a slideway in which moves the head 137 of the wiper. On the lower side of this head are two racks 138 meshing with the toothed segments 96. The wiper is constructed in known manner, the iron being electrically heated.

The braking lever 67 is adapted to engage the eccentric 11 and is provided with a brake lining 99. The end of the lever is attached to a spring loaded pusher 100 adjustable so as to permit the braking effort to be increased or reduced.

Figure 8:
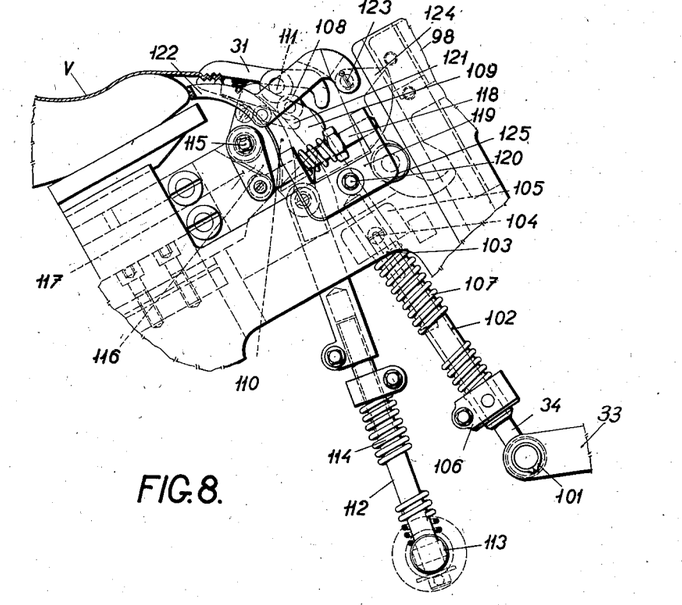
Fig. 8 is an enlarged fragmentary view showing the front pair of pincers in side elevation.

The connecting rod for the front pincers 31 (Fig. 8) consists of the rod 34 with an eye 101 to allow attachment to the bearing 33 and the rod passes through the hollow rod 102 having a slot 103 through which passes a pin 104 connecting the inner rod 34 with a collar 105 slidable on the outer rod 102. Secured fast on the lower end of the outer rod 102 is a collar 106 which being adjustable allows regulation of the tension of a spring 107. The spring is positioned between collars 105 and 106 and provides a yieldable connection between the inner and outer rods and allows the shoe upper to be pulled yieldably over the last. The end of the rod 102 is bifurcated and connected to a roller 108, which is guided on the oblique surface of the lower jaw of the pincers in an aperture in the pincers' head 109. This head is also provided with an arcuate groove 110 for guiding both the lower and the upper jaws of the pincers, the upper resilient jaw being associated by means of the pivot 111 with the shoulders of the lower jaw. The arcuate groove 110 in the pincers' head enables the material held by the pincers to be pulled down and under the last in the same way as by hand pincers, namely in the direction of the last in conformity with its shape. The lower end of the lower jaw is connected to a spring-loaded push rod 112 pin jointed by a pin 113 to the machine frame 10. The connecting rod 34 serves to pull out the shoe upper. In its downward movement it lifts one end of the upper jaw against the action of spring 114 and presses the other material-engaging end against the material. The rod 112 acts upwardly against the pull of the first connecting rod, whereby the necessary clamping effort is imparted to the pincers and thus a firm grip of the shoe upper is obtained.

The head 109 is also formed with a transverse bore in which is rotatable a shaft 115 on which is keyed a wedge 116 positioned in the groove in the head, this wedge having the function of securing the lower jaw when the material is released from the pincers. This shaft also carries a crank 117 connected to a spring-loaded rod 118 which is slidable in a bearing 119 pivotal on a pivot 120 on the machine frame, the rod co-operating with the oblique surface of an adjustable track attached to the wiper carrier 98. On either side the head 109 is provided with oblique grooves 121 guiding a last-positioning support 122 rotatable about a pivot 123 on a pawl-shaped catch 124 which is pivotal on a pivot 125 on the frame. The function of the support 122 is to limit the insertion of the shoe to a uniform depth when it is introduced into the machine.

The two side pairs of pincers 47 (Fig. 10) also have each an operating connecting-rod and a push rod similar in construction to those of the front pincers. The two side pincer-pairs are of similar construction, so that it is sufficient to describe one of them. The two rods are thus associated with a head 126, having a recess to accommodate the forked end of the connecting rod 53 which slides on a shoulder of the lower jaw and operates the upper jaw of the pincers. The head also has on each side a smaller arcuate guide 127 accommodating a slidable pin 128 which passes through the head and carries on the outside a connecting rod 129 secured to the link 57. Both the upper and the lower jaws are pivotal on this pin 128. The head is also formed with two arcuate guides 130 larger than guides 127, which accommodate sliding rollers 131 mounted on a pin 132, secured to the lower jaw whereby the lower jaw is guided. A horizontally disposed pin 133 is transversely secured to the head and is rotatably and slidably guided in the guide of a carrier 134, which is also the carrier of the front pincers and a shoe support conforming with the shape of the sole. A bush or sleeve provided on a hand lever 135 is operatively connected with this pin 133 (Figs. 1 and 2).

Each lever 135 is a two-armed lever fulcrumed on the pivot 140 supported on the frame. One arm of said lever is provided with a sleeve 141 which engages the slidable pin 133 of the head-piece 126. By an angular displacement of the arm which is provided with the handle, the sleeve 141 slides the pin 133 within the guideway of the carrier 134 whereby the head-piece 126, with the side pincers 47, is moved forwardly or rearwardly along the longitudinal axis of the last. Both the left-hand side and the right-hand side pincers 47 have their proper hand-operated drive so that these members are entirely independent of each other when the upper is positioned on the last.

The previously described pair of hand levers 54 serves to adjust the shoe upper after its insertion in the machine across the last, while the second pair of hand levers 135 serve to adjust the upper over the length of the last. The levers 54, which are pivotally mounted on the shaft 46, engage the pivots 142 of the ball bearings 56, and are articulately coupled together by means of a link mechanism 143, to the middle of which a holding rod 144 of known type is pivotally attached, this rod being mounted in the frame base and moved into locking position by the link mechanism when the latter is lowered by the rods 57 operated from the cam 14. Before the material is released from the pincers immediately prior to the wiping operation the two pincers are secured by this holding rod in the lowered position. To enable the pincers actually to open in this position just prior to the wiping-over operation, in their opening the pincers are followed by a push rod 145 which is adjustably attached to the wiper support and contacts with the above-mentioned linkage when the pincers commence to open. The latter are however already secured by the holding rod 144, so that they do not move upwards but leave room for the wiper. During the lowering of the wiper carrier, the push rod 145 forces the holding rod 144 out of its locking position and holds it down during the wiping operation, following which, and the further rotation of the shaft 8, the holding rod moves quickly through its locking position as the pincers are snapped upwardly by the spring-loaded rods 57. Each pair of side pincers also is swung laterally about the rotatably mounted pin 133 as an axis during the additional lowering of the pincers by the action of the rod 145, and following the release of the wiper to move upwardly, with the attendant upward and inward movement of the pincers, each pincer carrying head 126 is given an additional thrust by means of a spring 146 which is attached to the machine frame and presses against the cam 136 attached to the head 126, so that after the wiping of the upper the head is returned to its original position.

The whole device operates in the following manner:

Before the machine is set in operation the operator positions the shoe upper V on the last on the underneath of which the insole or sole, to which the upper is to be attached, has already been arranged. He then introduces the work into the machine, namely on to the main support, pushing the front of the last against the last-positioning support 122, which ensures that the shoe is always inserted a uniform distance into the machine. The front part of the upper is thus set between the jaws of the open front pincers 31. After setting the machine in operation he presses with his right foot on the right hand pedal 1 so as to swing out the lever 2, which as already mentioned interengages the elements of the clutch 9 by urging the shaft 6 to the left (Fig. 3) against the action of spring 7. At the same time escapement 16 is released by the raising of the screw 20 and is rotated by the tensioned spring 18 to strike the pin 22, thus allowing the operation of the machine. The control disc 15 then rotates and with its fingers or the first of its fingers 24, presses the segment 16 back against the influence of its spring 18, the machine being thereby stopped since the screw 20 of the lever 2 snaps back into the recess provided for it in the escapement 16, the lever 2 swings outwardly and allows the spring 7 to return the auxiliary shaft 6 and disengage the clutch element 9. During this rotation all the cams on shaft 6 have been rotated, the cam 13 for the front pincers 31 having lifted the lever 30, so that the other end of this lever 30 pulls the connecting rod 34 of the said pincers down against the spring 107 and the material or shoe upper is pressed by the upper jaw against the lower jaw, which with the simultaneous compression of the spring 114 of the push rod 112 presses the material further against the upper jaw and then clamps it. When this clamping operation has been concluded the pincers move further with the upper, namely in a certain path predetermined by the arcuate groove 110, from the toe of the shoe and in accordance with the shape of the last.

Directly the upper has been clamped in this way by the front pincers at the toe part, the operator presses the shoe against the lower support, inserts the edges of the upper into the side pincers 47 and again depresses pedal 1. The previously described action of the actuating mechanism is repeated up to the stopping of the machine, the second finger 24 of the control disc 15 pressing back the escapement 16. In the further rotation of the shaft 6 the cam 14 for the side pincers 47 now becomes operative and lifts the levers 48 for these pincers, so that the arms 51 thereof pull the connecting rods 53 down, against the springs 52, so that the upper jaw of the pincers presses the material against the lower jaw. When the material has been thus clamped between the jaws the whole pincers descend as allowed by the two grooves 127 and 130 against the action of springs 57 in the direction of the last and, in accordance with the lower predetermined arcuate track, following the shape of the last. The operator then ascertains whether the material has been properly clamped and he is able to adjust the upper (if it should have been positioned on the slant) both across the last and along the last to the toe or heel. If the operator wishes to adjust the material across the last, he presses the left hand lever 54 upwards and the right hand lever downwards, or vice versa, thus pulling the clamped upper either to the right or the left and correcting its position. If the upper has not been stretched sufficiently the operator depresses the two hand levers 54 so as to stretch the upper more. If the upper has been stretched too much towards the sides and not enough towards the front, the material is loosened by raising the two hand levers so that the front pincers can pull the material taut. If the upper requires to be adjusted towards the toe or towards the heel, this is effected by using the other handles 135. If the upper has been positioned and stretched generally incorrectly, these errors can be corrected by depressing the second pedal 62, so that the machine runs backwards by means of the toothed segment 60 and gear 26' and the shoe upper is released by first disengaging the side pincers, so that the upper can be clamped afresh. When the upper has been properly clamped by these side pincers, the pedal 1 is again depressed so that the machine is set in operation once more and is then stopped again by the third finger 24 of the control disc (which is omitted in Fig. 4). During this third rotation the eccentric 11 is rotated still further, becomes operative with regard to the smoothing device and depresses the lever 63 thereof. Consequently the carrier 98 with the wiper head 137 is moved down on the slideway in the machine frame. The rod 39 for the pad 43 is at the same time raised by the eccentric, so that the lever 42 with the pad 43 swings downwards towards the shoe, whose upper it secures to the last. The shoe upper is now ready for ironing or smoothing.

In order that the pincers will free the material for the wiping-over operation and not get in the way or move upwards, they must be locked in their lowermost position after the material is released. This is effected by the said push rod of the wiper lowering the said holding rod of known type by means of which the side pincers are secured in the lower gripping position, and holding this rod in its lowered position until the shaft 8 is again started following the wiping operation. At the same time the front pincers are secured by the action of spring-loaded rod 118 which, sliding in the pivoted bearing 119, enters a recess in said oblique surface of the wiper carrier 98, during the downward movement of said carrier. As a result, the crank 117 is rotated and the wedge 116 locks the lower jaw of the pincers. At the same time the cam 12 of the heel support rocks the resilient lever mechanism so that the rail 74 is moved forward in its guide, i. e. into the machine towards the toe, and the angle piece 78 comes into contact with the heel of the shoe and presses it securely against the wiping claws. The rail 74 is secured by swinging downwards and by the pawl 84 snapping into the groove of the heel support carrier. When these operations have been completed the pincers are opened to release the material to the wiper. During the lowering of wiper the last-positioning support 122 also drops, sliding in the recess in the head of the front pincers, its pawl being rotated by the catch and carrying along the support. Thus the path is free for the wiper, which slides into its working position.

To keep the path quite free and to permit the opening of the pincers and the release of the material for the wiping over operation, the adjustable rod 145 previously referred to presses down the two push rods 57 for the side pincers by means of the said holding rod 144 and link mechanism 143, so that the pincers drop slightly and the distance between the wiper and the pincers is maintained for both short and long shoe-upper-edges. The upper is now wiped-over in the usual manner, the carrier of the wiper being stopped and the toothed segments 96 pushing the wiper head 137 forward so that it can wipe-over the shoe upper. The machine remains in this position. The machine is double-sided as shown in Fig. 2, and the operator now prepares the next shoe. For withdrawing the shoe from the machine after the wiping-over operation, the pedal 1 is depressed, which completes a full revolution of the main shaft 8, and all the parts return to their original positions.

References to "shoes" in the foregoing specification and in the following claims are to be taken as including not only shoes but also like articles of footwear. Thus boots are included.

I claim:

1. A lasting machine for pulling-out and wiping-over the toe portion of a shoe-upper positioned on a last, as a preliminary to tacking said upper to the insole, the machine comprising pincer-pairs adapted to grip the upper at positions around the edge of its toe-portion, supports for said pincer-pairs allowing movement of said pairs between a grip-taking position and a displaced position being movement in paths which are in accordance with the shape of the last, a wiper movable into a position to engage the upper and further movable to wipe-over the upper on the last, the pincer pairs in displaced position being free of the path of said wiper, actuating mechanism which, the pincer pairs being in grip-taking position, causes the said pairs to grip the upper, thereafter causes movement of the said pairs to displaced position so as to stretch the upper firmly over the last and causes the wiper to wipe-over the upper, the pincer pairs being caused to release their grip to the wiper in such a way as to maintain the upper in stretched condition, and positive locking means for maintaining the pincers in displaced position so as not to obstruct said wipe-over movement of the wiper.

2. A lasting machine for pulling-out and wiping-over the toe-portion of a shoe upper positioned on a last, as a preliminary to tacking the upper to the insole, the machine comprising a front pair of pincers adapted to grip the edge of the upper towards the point of the toe portion thereof, and side pairs of pincers adapted to grip the edge of the upper at the sides of the toe portion thereof, supports for said pincers allowing a determinate movement of the pincers in relation to the support between a grip-taking position and a displaced-position being movement in paths according to the shape of the last (that is in the direction of the last), a wiper movable to wipe-over the upper on the last, the pincers in displaced position being outside of the path of said wiper, a last-positioning support movable between operative and inoperative positions being respectively positions in which it engages the last and in which it is outside of the path of said wiper, actuating mechanism which, the pincers being in grip-taking position, and the last-positioning support being in operative position causes the pincers to grip the upper, thereafter causes movement of the pincers to displaced position so as to stretch the upper firmly around the last and causes the wiper to wipe-over the stretched upper, the pincers being caused to release their grip to the wiper when the wiper has come in contact with the upper and the distance between the upper and the last is a minimum, and positive locking means for maintaining the pincers in displaced position so as not to obstruct said movement of the wiper, the last-positioning support being caused to move to inoperative position so as not to obstruct said movement.

3. A lasting machine according to claim 1 and further comprising a last-positioning support movable between operative and inoperative positions, being respectively positions in which it is adapted to engage the last towards the point of the toe-portion thereof and positions in which it is outside the path of said wiper, the support comprising a lever whose one end is constituted as a last-engaging member, a pivot for the lever, guides in which said pivot is slidable being guides inclined downwardly with reference to the length of the last, a pivotal catch pivotally connected to the said lever's other end, a cam surface being provided on the wiper adapted to engage said catch and move the last-positioning support from operative to inoperative position as the wiper moves to wipe-over the upper.

4. A lasting machine according to claim 1 wherein the positive locking means includes a holding rod movable between an inoperative position and an operative position in which it locks a pair of said pincers, and an operative connection between said wedge holding rod and the wiper which is such as to move the holding rod to operative position for locking said pair of pincers during wiping-over movement of the wiper.

5. A lasting machine according to claim 1, and further comprising structure supporting the support for each pair of pincers so as to allow movement of the pair of pincers and its support both longitudinally and transversely of the last, and further allowing movement of the pair of pincers relative to the support transversely of the last.

6. A lasting machine according to claim 1 and further comprising a pin on the support for each such pair of pincers; the pin being longitudinally disposed with reference to the length of the last, and structure rotatably and slidably receiving the pin so as to mount the support for rotational movement transversely of the last and for sliding movement lengthwise of the last, allowing thereby positional-adjustment of an upper on the last in all directions.

7. A lasting-machine according to claim 1 wherein the actuating mechanism includes a clutch constituting disconnectible drive-imparting means for said mechanism, clutch-biasing means tending to maintain said clutch disengaged, an escapement device having first and second limit positions being respectively positions in which it allows and prevents disengagement of the clutch by said clutch-biasing means, said clutch-biasing means embodying a stop adapted to maintain the escapement in its first limit position and the escapement device embodying escapement-biasing means tending to maintain the device in its second limit position, a restoring member that receives clutch-imparted drive and is adapted to restore the escapement device to its first limit position, and a pedal operable on the clutch-biasing means to cause release of the escapement device from said stop and to cause engagement of the clutch.

8. A lasting machine according to claim 1 wherein the actuating mechanism includes a clutch constituting disconnectible drive-imparting means for said mechanism, clutch-biasing means tending to maintain said clutch disengaged, an escapement device having first and second limit positions being respectively positions in which it allows and prevents disengagement of the clutch by said clutch-biasing means, said clutch-biasing means embodying a stop adapted to maintain the escapement in its first limit position and the escapement device embodying escapement-biasing means tending to maintain the device in its second limit position, a restoring member that receives clutch-imparted drive and is adapted to restore the escapement device to its first limit posiiton, and a pedal operable on the clutch-biasing means to cause release of the escapement device from said stop and to cause engagement of the clutch, the escapement being thereupon moved to its second limit position by the escapement-biasing means and drive being imparted to the actuating mechanism until the escapement device is restored by the restoring member to its first limit position, whereafter the clutch-biasing means disengages the clutch, and arrests actuation of the machine, the escapement device being adapted to arrest operation of the machine at least prior to the wiping-over movement of the wiper.

9. A lasting machine according to claim 1 wherein the actuating mechanism includes an escapement device adapted to arrest actuation of said mechanism at predetermined stages during said actuation, a control member to restore actuation when it has been arrested, and means operable to actuate said mechanism reversely so as to allow repetition of operations which have been effected unsatisfactorily, said means for actuating the mechanism reversely comprising a toothed gear, a drive shaft to which the toothed gear and control member are keyed, a toothed segment meshing with said toothed gear, and a link and lever mechanism operatively connected with said toothed segment.

10. A lasting machine according to claim 1, supports for some at least of said pincer-pairs being adjustably mounted so as to allow positional-adjustment on the last of an upper gripped by said pincer-pairs, wherein the actuating mechanism includes a clutch constituting disconnectible drive-imparting means for said mechanism, clutch-biasing means tending to maintain said clutch disengaged, an escapement device having first and second limit positions being respectively positions in which it allows and prevents disengagement of the clutch by said clutch-biasing means, said clutch-biasing means embodying a stop adapted to maintain the escapement in its first limit position and the escapement device embodying escapement biasing means tending to maintain the device in its second limit position, a restoring member that receives clutch-imparted drive and is adapted to restore the escapement device to its first limit position, and a pedal operable on the clutch-biasing means to cause release of the escapement device from said stop and to cause engagement of the clutch, the escapement being thereupon moved to its second limit position by the escapement-biasing means and drive being imparted to the actuating mechanism until the escapement device is restored by the restoring member to its first limit position, whereafter the clutch-biasing means disengages the clutch and arrests actuation of the machine, the actuating mechanism further comprising manually operable means for reversely actuating the said mechanism including the restoring member independently of clutch-imparted drive, and the restoring member embodying at least one escapement-engaging detent yieldably urged to engaging position and adapted to yield when the actuating mechanism is reversely driven, so as to effect such reverse actuation independently of escapement control.

11. A lasting machine according to claim 1 and further comprising an adjustable toe pad independent of the wiper and movable between operative and inoperative positions being respectively positions engaging an upper on the last and positions free of said upper, the actuating mechanism causing the said pad to move to operative position being operated coincidentally with the movement of the wiper to upper-engaging position, so as to secure the upper on the last while the pincers release their grip to the wiper.

JOHN HOZA.